(12) United States Patent
Reese (10) Patent No.: US 6,607,514 B2
(45) Date of Patent: Aug. 19, 2003

(54) BODY LOTION APPLICATOR SYSTEM

(76) Inventor: Timothy A. Reese, 114 Courtland Dr., Greenville, SC (US) 29617

( * ) Notice: Subject to any disclaimer, the term of this patent is extended or adjusted under 35 U.S.C. 154(b) by 0 days.

(21) Appl. No.: 09/968,118

(22) Filed: Oct. 1, 2001

(65) Prior Publication Data

US 2002/0042598 A1 Apr. 11, 2002

Related U.S. Application Data

(60) Provisional application No. 60/237,992, filed on Oct. 5, 2000.

(51) Int. Cl.$^7$ .............................................. A61M 35/00
(52) U.S. Cl. ...................... 604/289; 206/210
(58) Field of Search ............................. 401/8; 15/222; 204/494; 442/45, 36; 206/210, 828; 604/289, 290

(56) References Cited

U.S. PATENT DOCUMENTS

| | | | |
|---|---|---|---|
| 1,533,733 A | | 4/1925 | Gillum |
| 3,129,811 A | | 4/1964 | Williams ...................... 206/46 |
| 3,959,841 A | | 6/1976 | Horne ...................... 15/104.94 |
| 4,101,026 A | | 7/1978 | Bonk |
| 4,219,129 A | * | 8/1980 | Sedgwick ...................... 118/43 |
| 4,759,652 A | | 7/1988 | Ulrich |
| 4,817,790 A | | 4/1989 | Porat et al. |
| 5,251,990 A | | 10/1993 | Vought et al. |
| 5,632,731 A | * | 5/1997 | Patel ............................. 602/47 |
| 5,736,213 A | | 4/1998 | Meir |
| 5,745,949 A | | 5/1998 | Pine |
| 5,823,497 A | * | 10/1998 | Weatherhead ............ 248/316.7 |
| 5,915,394 A | | 6/1999 | Rickard |
| 5,983,436 A | | 11/1999 | Mason et al. |
| 6,092,690 A | * | 7/2000 | Bitowft et al. ............... 206/494 |
| 6,162,959 A | * | 12/2000 | O'Connor ...................... 602/41 |
| 6,368,539 B1 | * | 4/2002 | Greenfield et al. .......... 264/284 |
| 6,376,213 B1 | * | 4/2002 | Oda et al. .................... 435/135 |

* cited by examiner

Primary Examiner—Weilun Lo
Assistant Examiner—Linh Truong
(74) Attorney, Agent, or Firm—McNair Law Firm, P.A.; Robert R. Reed; William D. Lee, Jr.

(57) ABSTRACT

An applicator system is provided for storage and retrieval of applicator strips from a container to be used for applying a liquid preparation to a user's body. An elongated applicator strip is hand held for the user to apply the liquid preparation on remote body parts, such as the back. The applicator strips can be sealed in the container to prevent the evaporation of the liquid preparation contained therein. The applicator strips have laminated layers including an absorbent first layer to receive and retain the liquid preparation. A non-absorbent stabilizing second layer is included to provide strength and dimensional stability. Preferably, the strip includes two outer first layers and one middle second layer. Each elongated applicator strip is preferably about 36 inches in length and about 4.5 inches in width.

10 Claims, 6 Drawing Sheets

BODY LOTION APPLICATOR SYSTEM

This application claims benefit of No. 60/237,992 Oct. 5, 2000.

BACKGROUND OF THE INVENTION

This invention is directed to providing a means for someone to topically apply a cream or lotion to the surface of their body, and in particular to provide an applicator system which allows someone to apply a liquid preparation or a therapeutic treating agent to hard to reach body parts without assistance from another person.

Recent medical evidence has verified the importance of applying some type of liquid preparation, such as a sun-screen, to the human body for topical treatment before or after exposure to the environment and/or physical activity. For example, applying a sun-screen prior to any exposure of the skin to the sun will helps reduce the risk of malignant tumors of the skin. The term sun-screen is used herein to identify any substance, such as para-aminobenzoic acid used in suntan lotion preparations, to protect the skin from excessive ultraviolet radiation.

A further protection against overexposure of the skin's surface by the sun is realized by slowly obtaining a suntan using a tanning salon. The tanning salon is also used during the winter months when outside exposure is limited. Tanning salons use a liquid preparation having an "accelerator" for relatively safe and rapid tanning. Salons have small cubicles where a tanning lamp is used along with the accelerator to get a suntan. Space is very limited and the accelerator must be placed on hard to reach areas of the body by the person getting the suntan.

A further need for an individual to apply a therapeutic body lotion to hard to reach body areas exist in locker rooms and shower facilities that support a sporting activity. Typical activities include tennis, golf, basketball, soccer, football and the like. Athletes take care of their own needs and the use of another person to apply a therapeutic lotion, such as Myoflex, Ben Gay and Sportscreme, would generally be considered to be strange behavior. An exception is the sports medicine professional that is treating injuries. The need exists for an applicator system that is easily accessible, ready to use, disposable and meets the therapeutic requirements of athletes within the locker room.

An important factor in applying a liquid preparation to the body is the convenience or ease of using the applicator system each time an application is anticipated. In particular, the storage, transporting, use and disposal of the various components are critical in promoting the convenience and benefit of an applicator system. In addition, the material used in making the components should be biodegradable for environmental reasons. The liquid preparation should also be nontoxic and soluble in water. A number of typical application system components of the art are discussed in the following paragraphs, along with the remaining problems not solved by the art.

Applicator strips for applying liquid preparations and soap to remote parts of the body are disclosed in U.S. Pat. Nos.: 1,533,733; 3,959,841; 4,759,652; 5,251,990; 5,736,213; and 5,983,436. The applicator strips of these references disclose and claim some type of pocket, hole, loop or a clip at each end for the user's hands and fingers for holding a cloth, rubber, plastic or fabric strip. The fabric cloth of '733 and '841 is folded and stitched together to form a strip. The flexible strip of '990 depends on stretching the strip to force lotion from expanded bubbles of an artificial rubber portion of the strip. The lotion applicator '213 patent has elastic loop handles and includes internal pockets. No disclosure of the biodegradable properties of the material used for making the strips was found.

Storage and transportation of an applicator system is critical for the convenience in having a liquid preparation available to apply to the body. A container for the applicator strip or strips must be easy to carry or easily accessible and provide an adequate shelf life for strips having volatile evaporating liquids. Transporting the applicator system from place to place may be necessary to provide liquid preparations protection when and where needed. The protection may be needed around the house, on a vacation or when simply taking a walk. The tanning salon or locker room container must be easily accessed by the user within the room where it is being used. Packaging either a single applicator strip or a number of strips may be desirable and/or cost effective.

The packaging of an applicator or a towelette is disclosed in U.S. Pat. Nos.: 3,129,811; 5,745,949 and 5,915,394. A single applicator, sponge or towelette is folded a number of times in both edge directions to provide a compact size for placement in a package, container or envelope having an internal cavity and sealing the package or envelope until the applicator, sponge or towelette is needed. A single applicator having two layers was disclosed in the refreshing kit '811 for cleaning and refreshing the skin by applying a fragrance. Neither of these references disclose packaging of multiple biodegradable applicators or towelettes, and the package or envelope does not have a handle for easy transportation.

The need to have multiple applicator strips dispensed from a single container is desirable and cost effective for multiple users and for frequent sun-screen applications. Packaging of multiple strips is disclosed in U.S. Pat. Nos. 4,101,026 and 4,817,790. Multiple folded towelettes or towelletes in rolls which have been pre-moistened are sealed in a reclosable container or pouch for dispensing one at a time through a feed slot or lid. Towelettes are folded prior to rolling the towelette in a roll to allow wider strips of a relatively short length typical of towelettes. The containers were not equipped with handles for easy transportation, and no discussion of biodegradable strips with multiple layers was apparent in these references.

The references lack the utility of an easily manufactured and used applicator strip for applying liquid preparations or treating agents that can be economically packaged and marketed for multiple applications as needed; then discarded without adverse environmental impact. The proper use and combination of materials is essential to provide an applicator system which will topically apply the preparation or agent with little effort. The use of pockets, sponges, end handles and the like should be eliminated to obtain a cost effective easily used product.

The need remains to have multiple elongated strips in a single resealible container with a means for easily transporting the container. The strips should be multi layered to allow retention of the liquid preparation or treating agent within the generally saturated layer when rolled or folded in the container. A layer is also required to provide strength and stability to the applicator strip when held in an extended position for applying preparations and agents to the remote parts of the body, such as the back.

Accordingly, an object of the present invention is to provide a elongated applicator strip having adequate length and a relatively narrow width to be grasped by at both ends of the strip by the hands of a user for topically applying a liquid preparation or treating agent contained in the strip on remote parts of the user's body.

Another object of the present invention is to provide an applicator strip which is laminated from two or three layers of material including at least one layer of a liquid absorbent material carrying a liquid preparation or treating agent and at least one layer of a relatively non-absorbent and impervious material to provide strength and dimensional stability to the applicator strip.

A further object of the present invention is to provide an applicator strip or strips comprising materials and non-toxic liquids or agents which are biodegradable when disposed of as waste or refuse after being used by the user.

Still another object of the present invention is to provide a container for an applicator strip or strips for receiving and storing the applicator strip or strips prior to being used and having an opening means for dispensing said strip or strips when the container is held by a handle in one hand and an applicator strip is pulled from the container using the other hand. Alternatively, a container can be mounted on a wall for easy access by multiple users, such as in a locker room or tanning salon.

Yet another object of the present invention is to provide a container for a single applicator strip within a container or a plurality of applicator strips disposed within a single container with an resealable opening in the container to individually access the applicator strips.

SUMMARY OF THE INVENTION

The above objectives are accomplished according to the present invention by providing an applicator system for storage and retrieval of applicator strips from a container to be used by an individual for applying a liquid preparation or treating agent to his or her own body surfaces. In particular, an elongated applicator strip is used to access remote body parts, such as the back of the user when applying a sunscreen. The applicator strips are sealed in the container until they are used to prevent the evaporation of the chemical preparation or agent contained therein. The applicator strips are laminated to include two or three layers. At least one first layer is an absorbent layer to receive and retain the preparation or agent. The first layer or layers may be embossed to be more absorbant. At least one second layer is relatively non-absorbent and provides strength and dimensional stability to the applicator strip. Preferably the laminated applicator strip includes two embossed and absorbant outer first layers and one dimensionally stable middle second layer.

The improved applicator system of this invention is suitable for many different types of liquid preparations or treating agents. The system may be used for applying and administering various mixtures of liquids and agents. These two alternate terms are used herein to both mean the chemical compound used in the absorbent first layer or layers which is transferred to the user's body. A liquid preparation may be more applicable for a sun-screen and the like; where a treating agent may be more applicable for use in relieving a muscle pain or used as an accelerator. The structural configuration and design of the applicator strip depend on the nature of the preparation or agent. In particular, the number and relative location of the absorbent first layers and stabilizing second layers, depends on the physical properties of the preparation or agent. Design factors include insuring that ends of the applicator strip can be gripped and held while maintaining the same level of saturation as the remainder of the applicator strip. For example, with a highly viscous liquid preparation, the absorbent first should be located so that it becomes in direct contact with the user's body to allow easy transfer of the viscous material to the body. In this case, at least one absorbent first layer should be to the outside of the applicator strip.

In one embodiment of the invention, an applicator system is provided for a user to topically apply a liquid preparation to remote areas of the user's body. The applicator system comprises at least one elongated applicator strip having a plurality of layers and a pair of opposite free unobstructed ends. The opposite free ends to be gripped by a respective hand of the user for rubbing the applicator strip on the remote areas. At least one first layer of the plurality of layers is made of an absorbent material for receiving and retaining the liquid preparation until the applicator strip is rubbed on the remote areas by the user. At least one second layer of the plurality of layers is made of a material for providing strength and dimensional stability to the elongated applicator strip when the applicator strip is being held to apply the liquid preparation. The first and second layers are biodegradable when disposed of as refuse. A sealable container having a container cavity is provided for receiving and storing the at least one elongated applicator strip prior to being accessed by the user. An applicator strip is removed from the container and rubbed on the remote areas of the user's body by the user, so that the remote areas are generally coated by the liquid preparation.

In one aspect of the invention, a handle is formed in the container for holding the container when removing an applicator strip from the container and for transporting the container from place to place. In another aspect the container has a hinged cover for accessing the applicator strip and a mounting bracket for attaching the container to a mounting surface.

In another embodiment of the invention, a process is claimed for providing an applicator system so that a user can topically apply a liquid preparation to remote parts of the user's body. The process includes a first step of forming a container having a container body defining an accessible container cavity. The second step includes providing a container lid for the container with a hinged cap covering a cap opening in the container lid for sealing the container cavity. The third step includes fabricating an elongated applicator strip to include at least one absorbent first layer and at least one stabilizing second layer. The process includes a fourth step of perforating the elongated applicator strip widthwise to provide a plurality of applicator strips of a length usable for applying by hand the liquid preparation to the remote body parts. A fifth step includes partially saturating the absorbent first layer with the liquid preparation. In a sixth step the process includes rolling said elongated strip into at least one perforated roll. The seventh step includes removing the container lid and placing the perforated roll within the container cavity. The eighth step includes storing and sealing said perforated roll within the container cavity by placing the container lid on said container body. The process includes a ninth step of providing access to each applicator strip within the container cavity through said cap opening of said container.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
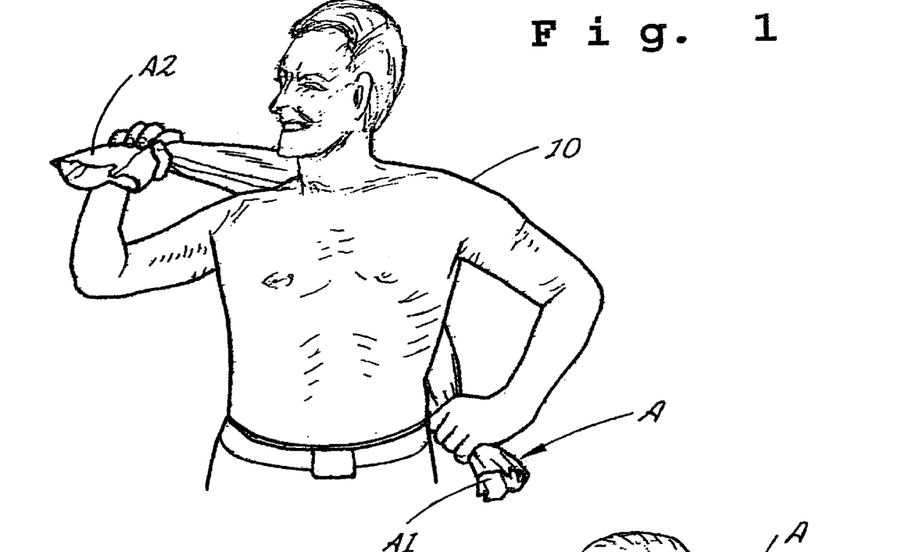
FIG. 1 is a front perspective view of an individual using an applicator strip to apply a liquid preparation (sun-screen) to his back.
Figure 2:
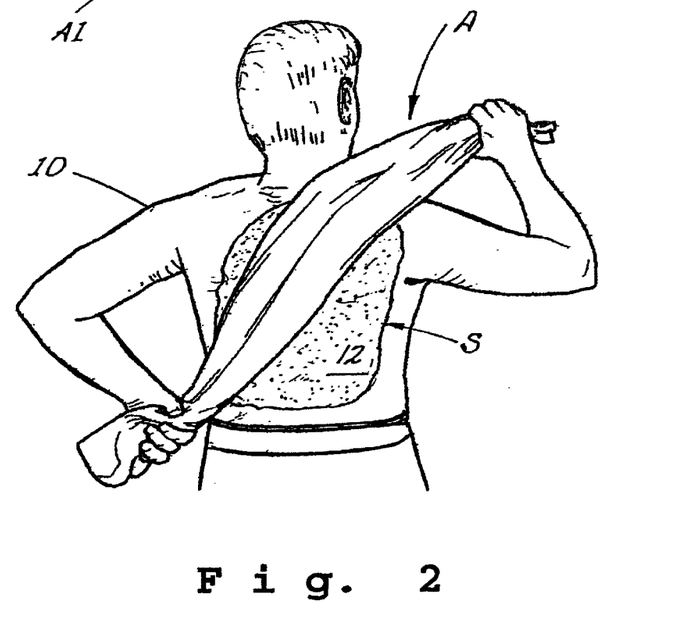
FIG. 2 is a rear perspective view of the individual having applied liquid preparation on a remote portion of his body.

Referring now in more detail to the drawings, the invention will now be described in more detail. The applicator system comprises a laminated applicator strip or strips containing a liquid preparation or treating agent for rubbing on body parts of a user for protection against exposure to the sun, as illustrated in FIGS. 1 and 2. The terms liquid preparation or treating agent can generally be used interchangeably. These terms identify any liquid or semi-liquid compounds or substances. For example, a sun-screen, such as para-aminobenzine acid, is used in suntan preparations or agents to protect the user's skin from excessive ultraviolet radiation from the sun.

Applicator strip A of FIGS. 1 and 2 is an elongated strip held at both ends A1 and A2 by the hands of the user 10. The liquid preparation S is being transferred from the applicator strip to the user by rubbing the applicator strip across a remote body part; such as the back 12 of the user. One essential feature of the applicator system of this invention lies in the ability of a user to apply the sun-screen without the help of a friend or a companion.

The applicator strip has first and second layers laminated together as illustrated in FIGS. 3, 3A, 4, 4A and 5. Alternatively, two outer layers 41b can be folded over the middle layer 41a, as illustrated in FIG. 3B and discussed in more detail below. A length L of the applicator strip is much larger than its width W so that a user can grip the ends of the elongated strip to apply liquid preparation to remote parts of the user's body with the lengthwise middle portion of the strip. The length can have a value over a range of about 30 inches to about 42 inches and the width can have a value over a range of about 3.5 inches to about 5.5 inches. The preferred length is about 36 inches and the preferred width is about 4.5 inches. The thickness of the applicator strip (T, T1, T2) can vary depending on the number of layers and the thickness of each layer. The thickness of the applicator strip is in a range of about 0.05 inch to about 0.25 inch. The preferred thickness is about 0.12 inch.

Figures 3, 3A, 3B:
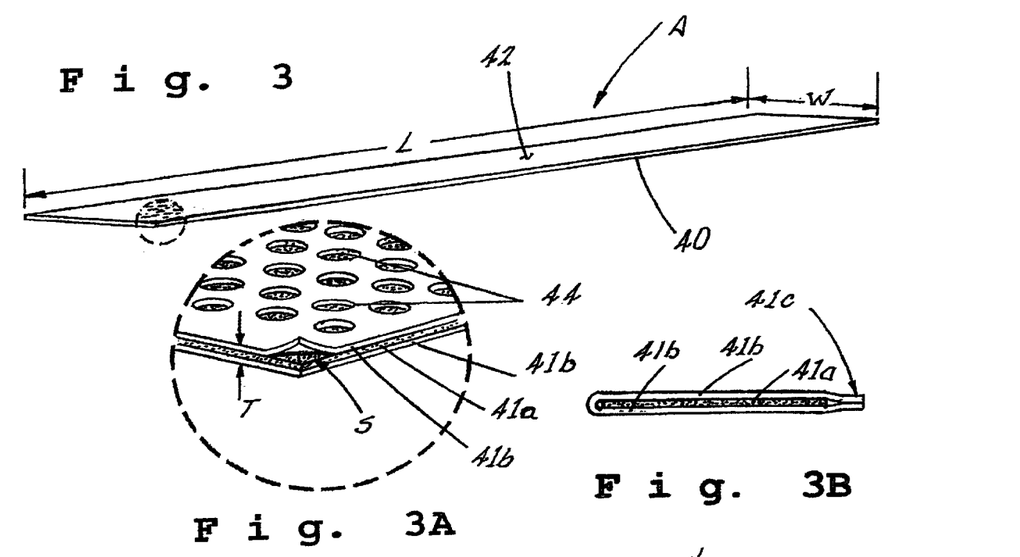
FIGS. 3 and 3A are perspective views of an applicator strip and a corner portion having a middle first layer generally soaked with a liquid preparation and two outer stabilizing second layers with openings to allow the sun-screen to be applied to the skin of an individual through the openings.
FIG. 3B is a side elevation view of an applicator strip showing the two outer layers of the same type formed by folding an lapping a wide outer layer over the middle layer.

The applicator strip A of FIGS. 3, 3A and 3B is a laminated three layer strip 40 comprising a single middle first layer 41a and two outer second layers 41b. The first middle layer is an absorbent layer which is generally saturated with liquid preparation S, such as a sun-screen. The liquid preparation is illustrated by areas shaded by stippling. Two second layers 41b have spaced apart openings 44 to allow the liquid preparation of the first layer to reach a top surface 42 of the applicator strip. The liquid preparation is transferred to the user by making body contact with the top surface. Two second layers provide additional strength and dimensional stability to the applicator strip. This applicator strip design is best used when the liquid preparation has a relatively low viscosity so that it saturates the middle layer and is easily transferred to the user's body. Without the use of at least one stabilizing second layer, the applicator strip can be torn apart or collapsed laterally by the user when applying liquid preparation to a remote body part, especially the back of a user.

Figure 4:
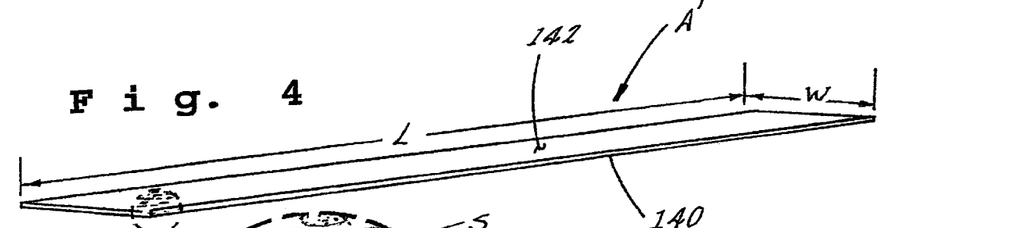
FIGS. 4 and 4A are perspective views of an applicator strip and a corner portion having two outer embossed first layers generally soaked with a liquid preparation and a middle stabilizing second layer.
Figure 4A:
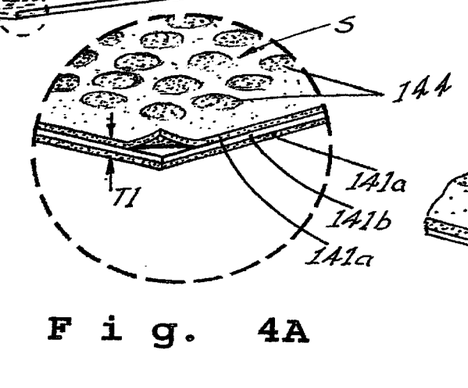

The applicator strip A' of an embodiment of the invention of FIGS. 4 and 4A is also a laminated three layer strip 140. However, applicator strip A' comprises two outer first layers 141a and a single middle second layer 141b. The first layers have embossed areas 144 which are used to allow more liquid preparation to be absorbed by these layers. As a result of having two first layers which are embossed, this embodiment represents an applicator strip having a relatively large amount of liquid preparation per unit top surface 142 area. This added capacity may be important depending on the size of the user and the amount of body area to be covered. This configuration and design is generally used with a liquid preparation having a relatively high viscosity, such as a analgesic creme used by athletes for sore muscle pain.

Figure 5:
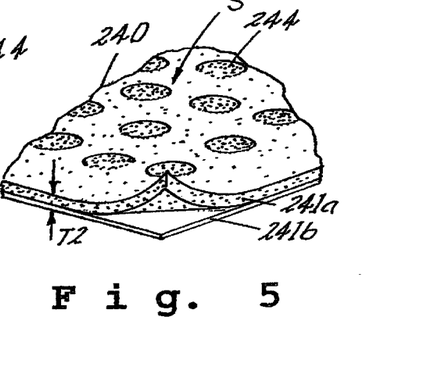
FIG. 5 is a perspective view of a corner portion of a applicator strip having a single embossed first layer generally soaked with a sun-screen and a single stabilizing second layer.

A laminated two layer applicator strip 240 is illustrated by a perspective view of a corner of the applicator strip in FIG. 5. This embodiment of the invention includes an embossed first layer 241a generally saturated with liquid preparation and a second layer 241b to provide strength and dimensional stability to the applicator strip. The embossed portions 244 provide an added volume for absorbing additional liquid preparation to apply on the body parts of a user. The second layer is again used to provide strength and dimensional stability to the first layer. This cost effective configuration and design is best used when there is no problem with the transfer of the liquid preparation from the first layer to the second layer when the applicator strip is rolled-up or folded and placed in a container, see FIG. 7. Any liquid transfer can make the applicator strip slick and difficult to handle. The second layer may also have spaced apart openings to allow the liquid preparation of the first layer to reach a bottom surface of the applicator strip. With spaced apart openings, applicator strip 240 may be used to apply liquid preparation to the body by direct contact between the user's skin and either first layer 241*a* or second layer 241*b*. Use of either side of the applicator strip also provides a means to vary the amount of liquid preparation being applied to best match the part of the user's body being protected. Some body areas, such as the back, may require more liquid preparation than other body areas, such as the legs and arms.

Preferably, the first and second layers provide a total of three layers comprising two outer layers and a middle layer. The three layers can be laminated together by either using an adhesive, by pressure and heat, or other laminating means known in the art. The two outer layers can also be formed by folding either one of a wide first layer or a wide second layer over the other layer and attaching together the lateral edges of the layer being folded. That is, using a folded layer in a three layer applicator strip is applicable with either the absorbent first layer or the stabilizing second layer comprising the outer two layers. The illustration of FIG. 3B shows the folded layer providing two outer second layers 41*b* connected at lateral edge 41*c*. However, the two outer layers may be second stabilizing layers, as illustrated in FIG. 3A, or first absorbing layers, as illustrated in FIG. 4A. The attachment means between lateral edges 41*c* of the folded layer may be made by an adhesive, by sewing, by pressure and heat, or any similar means.

The first layer or layers are made of a woven or non-woven absorbent material such as cotton, rayon, paper, foam or a mixture of these materials. The structure of the first layer is made to absorb and retain the liquid preparation until applied to the body by rubbing the applicator strip on the body. The liquid preparation is generally placed on the first layer shortly before or after packaging the applicator strip in the container. The material of the first layers is made flexible and comfortable when rubbed on the skin of a user; as well as being biodegradable. The material of the second layer or layers is of a material relatively non-absorbent and impervious to provide strength and dimensional stability to the applicator strip. The second layer material must be thin and molded by conventional techniques to be sufficiently inexpensive and also must be biodegradable and disposable after a single use. Preferably, the second layers are a wet strength type of paper to prevent the liquid preparation from the first layer from causing the second layer to lose its dimensional strength and stability. A paper second layer can be treated to prevent absorption of the liquid preparation from the first layer While the second layer is preferably not plastic, so it is biodegradable, it should be soft and pliable to not stick to the user's skin when it is the layer in contact with the skin. Therefore, rubber and neoprene materials are generally not suitable. It is essential to this invention that the materials used in the applicator strips are capable of being broken down, especially into innocuous products, by the action of living things, such as living microorganisms.

Figures 6, 7:
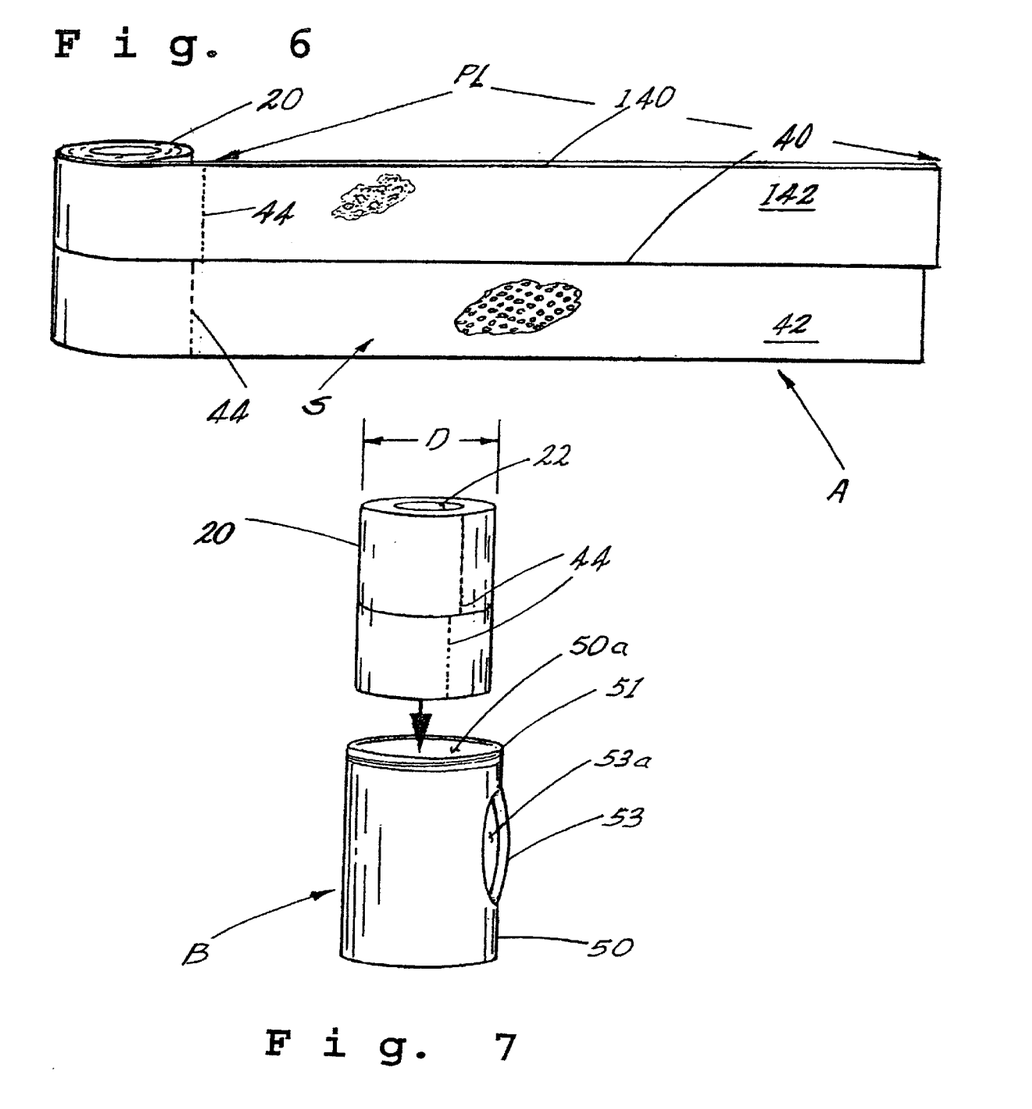
FIG. 6 is a perspective view of two applicator strips being rolled and placed together one roll upon another.
FIG. 7 is a perspective view of two rolls of applicator strips placed together for placement in a round container having a handle.

To provide applicator strips for a number of applications of the liquid preparation, one embodiment of the applicator system includes a container for holding a roll of applicator strips, as illustrated in FIGS. 6 and 7. For the embodiment shown, two applicator rolls 20 are placed together to form a unit to be placed within a container B. Each roll comprises a series of individually removable applicator strips (140 or 40) placed end to end, as illustrated in FIG. 6. Perforations 44 are provided to separate adjacent strips of each roll. Adjacent strips of a respective roll can be separated from one another by tearing the roll apart by hand at a perforation. A perforation length PL provides the desired length for an applicator strip. There may be more or less than two rolls in a container within the scope of this invention. The two rolls illustrated include one top roll having outer first layer 142 (see FIG. 4A) and a second bottom roll having an outer second layer 42 (see FIG. 3A). Any combination of rolls is possible to fit the needs of the user. In addition, the applicator strips may be cut (i.e. using a knife or scissors) by the user to provide a shorter length applicator strip for easy to reach body parts, such as the hands and face.

A container B has a container body 50 with a container cavity 50*a* to receive applicator rolls 20, as illustrated in FIG. 7. The container body has a diameter somewhat larger than diameter D of the applicator rolls to permit easy placement of rolls in the container. In the embodiment illustrated, the applicator rolls each have a center access opening 22 so that retrieval of individual applicator strips can be from the center of a roll. The container body includes a handle 53 for the user in transporting the applicator system from place to place. A handle recess 53*a* provides space to assist the user in carrying the container and rolls. Container B also has a lid connector 51 at the top edge adjacent the container cavity; which interfaces with a container lid described in more detail later in this description.

Figure 8:
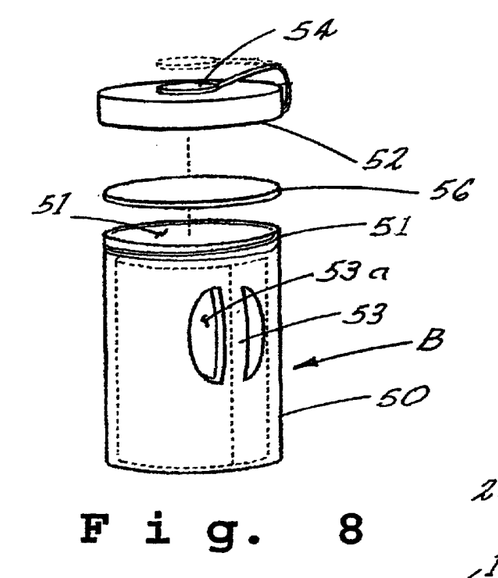
FIG. 8 is a perspective view of a container having a lid with a hinged cap covering a cap opening and a foil seal to seal the applicator rolls in the container body prior to being used.
Figure 9:
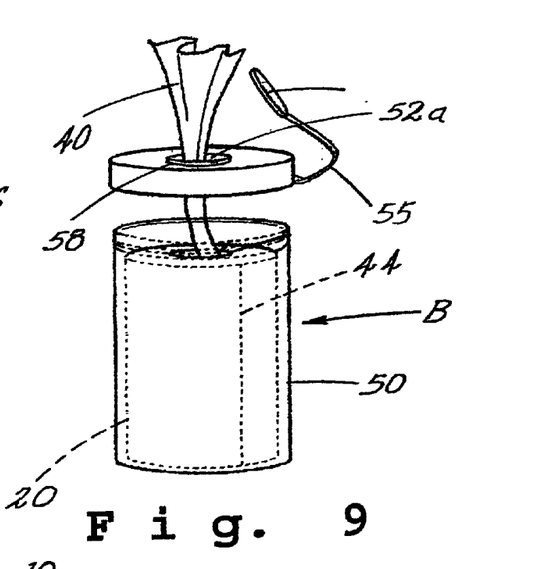
FIG. 9 is a perspective view of the container of FIG. 8 with a portion of an applicator strip extending through the cap opening prior to placing the container lid on the container body.
Figure 10:
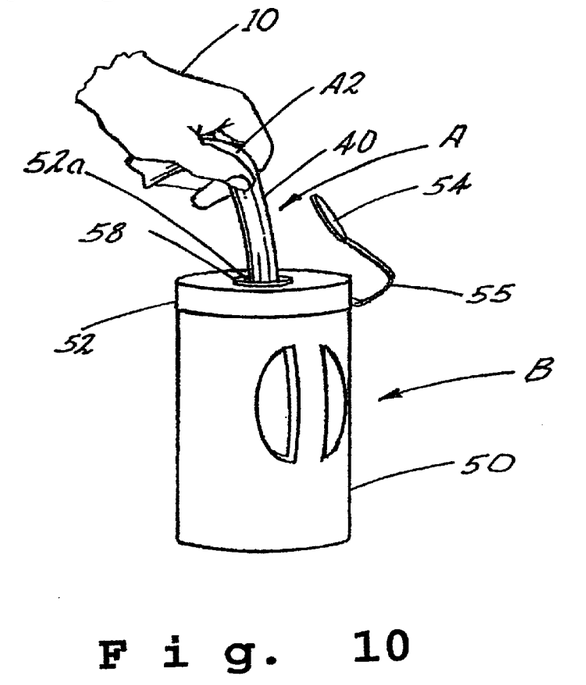
FIG. 10 is a perspective view of an individual pulling an applicator strip from the container through the cap opening.

A process for using container B to store and retrieve applicator strips is illustrated in more detail in FIGS. 8, 9 and 10. A container lid 52 having a hinged cap 54 is affixed to container body 50 using lid connector 51. The lid connector may be in the form of a spiral thread or simply a ridge which the lid snaps over. The lid has a corresponding thread or ridge to provide a seal against the evaporation of liquid preparation from the applicator strips when the lid is placed on the container body. A cap retainer 58 interfaces with hinged cap 54 to provide a seal between the hinged cap and the lid. A foil seal 56 may be placed over container cavity 50*a* to provide additional protection against evaporation prior to the applicator system being used to increase shelf life of the applicator system.

The process of accessing applicator strips is realized by first removing the container lid and the foil seal. Having removed the container lid, access to the applicator strips is achieved. Before replacing the lid on the container, applicator strip 40 is placed through cap opening 52*a*, as illustrated in FIG. 9. With applicator strips in perforated applicator rolls 20, adjacent strips are pulled through cap opening 52*a* when needed, as illustrated in FIG. 10. Handle 53 is gripped by one hand of the user to stabilize container body 50 while the other hand is used for pulling respective applicator strips through lid opening 52*a*. Respective applicator strips are separated at perforations 44 for use by the user. The hinged cap remains attached to the lid by cap hinge 55. Hinged cap 54 is placed on cap retainer 58 of the lid to reseal the remaining applicator strips within the container. The applicator strip is used by the user to apply liquid preparation to the user's body before being discarded as biodegradable refuse. The applicator system uniquely allows the user to apply liquid preparation without assistance from another person. Each applicator strip is used to apply the liquid preparation to a respective user's body and then discarded as biodegradable refuse.

Figure 11A:
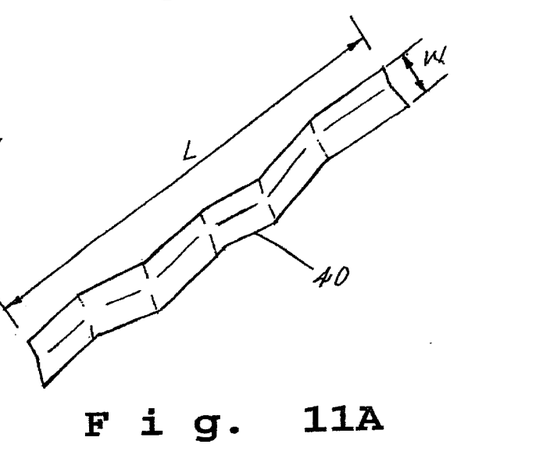
FIGS. 11A and 11B are perspective views of an elongated applicator strip having a liquid preparation being folded for placement in a packet type container.
Figure 11B:
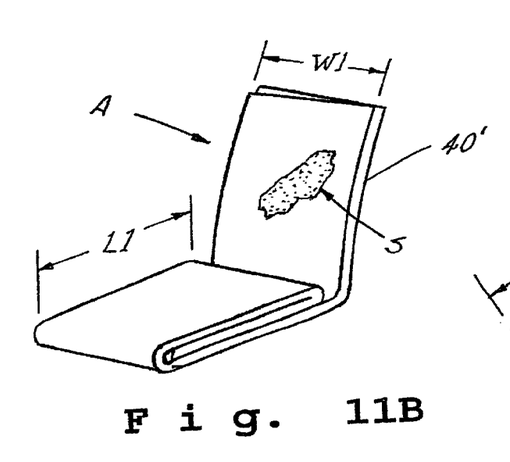

In another embodiment of the applicator system of this invention an applicator strip 40 is placed in a container comprising a packet 60, as illustrated in FIGS. 11A, 11B,

12A and 12B. This embodiment allows the user the opportunity to easily transport the applicator system. Only one or a few applicator strips are included within the packet. Each applicator strip 40 is folded in both directions to reduce strip length L and strip width W to a folded strip length L1 and a folded strip width W1, as illustrated in FIGS. 11A and 11B. The applicator strip is preferably soaked with liquid preparation S shortly before or after being folded. Preferably the liquid preparation is applied to saturate the first layer or layers of laminated applicator strip 40 shortly before being placed into the packet. Once again, the material of the applicator strip is biodegradable when discarded as refuse.

Figure 12A:
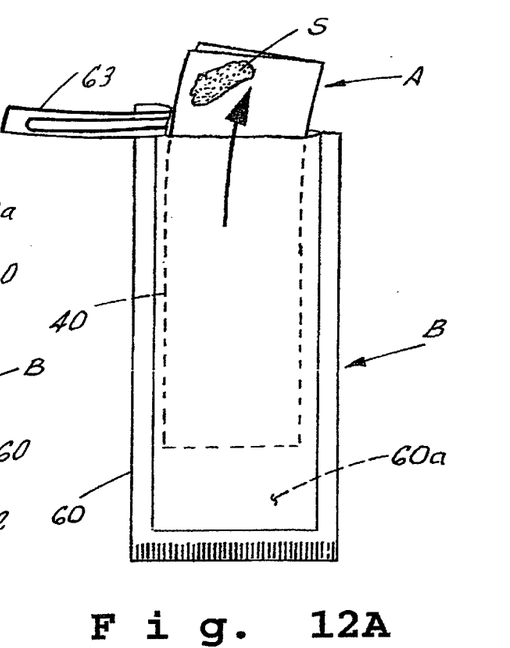
FIGS. 12A and 12B are plan views of the folded applicator strip of FIGS. 11A and 11B being stored within the packet and being removed from the packet.
Figure 12B:
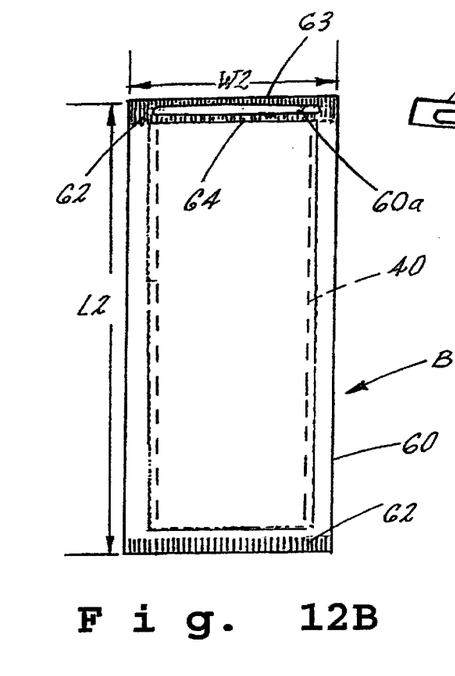

The packet includes a packet cavity 60a and end portions providing a packet seal 62, as illustrated in FIGS. 12A and 12B. The preferred packet is made of a flexible and tearable laminated sheet of material comprising a biodegradable inner layer which seals on the application of heat and an outer biodegradable layer of non-plastic material. The packet prevents the evaporation of the liquid preparation of the applicator strip and is opened by tearing the laminated sheet material. The packet includes a cutout or handle 63 for the user to easily transport the applicator system from place to place.

Figures 13A, 13B:
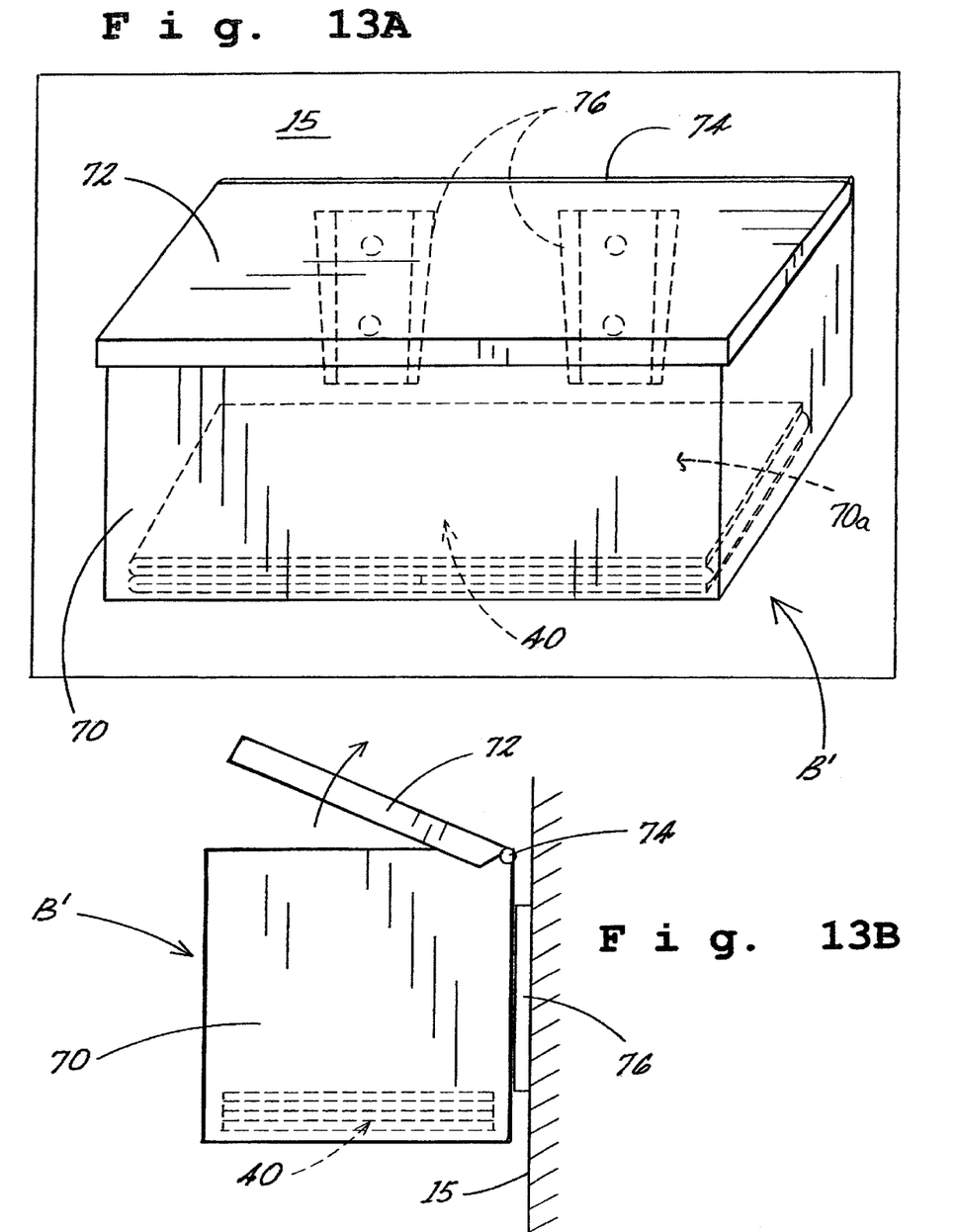
FIGS. 13A and 13B are perspective and side elevation views respectively of a wall mounter container having a hinge lid to access folded applicator strips within the container.

In yet another embodiment of the invention, the applicator system includes a rectangular shaped container which is mounted to a surface, such as a vertical wall, as illustrated in FIGS. 13A and 13B. A container B' has a container body 70 and a container cover 72 mounted by a cover hinge 74 to the container body. The container is mounted to a surface 15 with at least one mounting bracket 76. Folded applicator strips 40 are placed within a cavity 70a of the container. The folded applicator strips are accessed by rotating the cover about the cover hinge, as illustrated in FIG. 13B. The applicator system of this embodiment is best used in a public locker rooms, tanning salons and the like. The container is mounted to the wall for access by those persons using the facilities. The box shaped container 70 is used for the folded applicator strips. However, a cylindrical container with a container lid and cap (see FIG. 10) can also be used with rolls of applicator strips and mounted to the surface with a mounting bracket within the scope of this invention.

While a preferred embodiment of the invention has been described using specific terms, such description is for illustrative purposes only, and it is to be understood that changes and variations may be made without departing from the spirit or scope of the following claims.

What is claimed is:

1. A body lotion applicator system comprising:
   at least one elongated applicator strip for topically applying a liquid preparation to remote areas of the user's body and having a plurality of layers and a pair of opposite free unobstructed ends, said opposite free ends to be gripped by a respective hand of the user for rubbing said applicator strip on the remote areas;
   at least one first layer of said plurality of layers made of an absorbent material for receiving and retaining the liquid preparation until said applicator strip is rubbed on the remote areas by the user;
   at least one second layer of said plurality of layers made of a material for providing strength and dimensional stability to said elongated applicator strip when said applicator strip is being held to apply the liquid preparation;
   said first and second layers being biodegradable when disposed of as refuse; and
   a sealable container having a container lid that includes a capped opening and a container cavity for receiving and storing said at least one elongated applicator strip prior to being accessed by the user, wherein said at least one applicator strip is removed from the container and rubbed on the remote areas of the user's body by the user so that the remote areas are generally coated by the liquid preparation.

2. The applicator system of claim 1 includes a handle formed in said container for holding the container when removing said at least one applicator strip from the container and for transporting said container from place to place.

3. The applicator system of claim 1 wherein there are two first layers each laminated on a respective side of a single middle second layer, wherein said first layers are embossed to provide additional liquid preparation absorbing capability of said at least one applicator strip.

4. The applicator system of claim 1 wherein there are two second layers laminated on both sides of a single middle first layer to provide additional strength and dimensional stability of said at least one applicator strip, wherein spaced apart openings of said second layers permit the liquid preparation to transfer to the user's body from said middle first layer.

5. The applicator system of claim 1 wherein said first and second layers provide a total of three layers comprising two outer layers and a middle layer, wherein said two outer layers are formed by folding either one of a wide first layer or a wide second layer over the other layer and attaching together the lateral edges of the layer being folded.

6. The applicator system of claim 1 wherein a plurality of applicator strips are disposed within said container cavity so that said plurality of applicator strips are individually dispensed from said container through said capped opening in said container lid.

7. The applicator system of claim 1 wherein said container includes a hinged cap placed over said capped opening to close and seal said applicator strips within said container during storage, where said hinged cap is removed to access said applicator strips within the container.

8. The applicator system of claim 1 wherein said applicator strip comprises one first layer laminated to a single second layer with openings in the second layer so that either side of said each applicator strip is used to apply the liquid preparation to the user's body depending on the physical properties of the preparation being applied.

9. The applicator system of claim 1 wherein said container includes a container body forming a container cavity to receive folded applicator strips within the cavity, a container cover mounted to said container body with a cover hinge and a mounting bracket for attaching said container to a mounting surface, wherein said applicator strips are accessed by lifting said container cover and removing one applicator strip from said container cavity.

10. The applicator system of claim 1 wherein said elongated applicator strips are each about 36 inches in length and about 4.5 inches in width.

* * * * *